(12) United States Patent
Morton et al.

(10) Patent No.: US 12,565,328 B2
(45) Date of Patent: Mar. 3, 2026

(54) DIFFERENTIAL DRIVEN OPEN ROTOR WITH BRAKE

(71) Applicant: RTX Corporation, Farmington, CT (US)

(72) Inventors: Jeffrey T. Morton, Manchester, CT (US); Paul R. Hanrahan, Sedona, AZ (US); Andrew E. Breault, Bolton, CT (US); Jon E. Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/773,027

(22) Filed: Jul. 15, 2024

(65) Prior Publication Data

US 2026/0015098 A1     Jan. 15, 2026

(51) Int. Cl.
   *F02C 7/36*     (2006.01)
   *B64D 35/00*    (2006.01)
   *F02C 3/06*     (2006.01)
(52) U.S. Cl.
   CPC .............. B64D 35/00 (2013.01); F02C 3/06 (2013.01); F02C 7/36 (2013.01); *F05D 2220/323* (2013.01); *F05D 2260/40311* (2013.01); *F05D 2260/90* (2013.01)
(58) Field of Classification Search
   CPC ..................... B64D 35/00; F05D 2260/40311
   USPC ................................................ 475/224, 900
   See application file for complete search history.

(56) References Cited

U.S. PATENT DOCUMENTS

| | | | |
|---|---|---|---|
| 2,529,973 A | 11/1950 | Sedille et al. | |
| 3,375,996 A | 4/1968 | Wilde | |
| 3,678,690 A | 7/1972 | Shohet et al. | |
| 4,005,575 A | 2/1977 | Scott et al. | |
| 4,598,543 A | 7/1986 | Brewer | |
| 4,642,029 A | 2/1987 | Cedoz | |
| 4,845,944 A | 7/1989 | Rodgers | |
| 6,647,708 B2 | 11/2003 | Bornhoft et al. | |
| 6,837,038 B2 | 1/2005 | Eiler et al. | |
| 8,336,288 B2 | 12/2012 | Venter et al. | |
| 8,425,372 B2 * | 4/2013 | Lemmers, Jr. | ............ F02C 7/36 475/5 |
| 8,701,380 B2 | 4/2014 | Vuillemin | |
| 9,523,329 B2 | 12/2016 | Kupratis et al. | |
| 10,287,977 B2 * | 5/2019 | Wotzak | .................. B64D 35/00 |

(Continued)

OTHER PUBLICATIONS

Non-Final Office Action issued Aug. 1, 2025 in connection with U.S. Appl. No. 18/773,118, 23 pages.

(Continued)

*Primary Examiner* — Sherry L Estremsky

(57) ABSTRACT

An assembly for an aircraft propulsion system includes an open propulsor rotor and a powertrain configured to receive power from a turbine and drive both the propulsor rotor and a compressor section at the same time in a first mode of operation. In a second mode of operation, a brake is applied that stops rotation of the propulsor rotor and the turbine power received by the powertrain drives only the compressor section. In the second mode, the propulsor rotor is stationary or otherwise undriven which effectively prevents rotation of the propulsor rotor. This reduces or eliminates safety risks to ground crews resulting from an open propulsor rotor actively rotating as the aircraft is on the ground.

20 Claims, 9 Drawing Sheets

500

(56)       References Cited

U.S. PATENT DOCUMENTS

| | | | |
|---|---|---|---|
| 10,352,242 B2 | 7/2019 | Chartier et al. | |
| 10,711,791 B1 | 7/2020 | Rolling et al. | |
| 11,186,378 B2 * | 11/2021 | Dubreuil | F02K 3/06 |
| 11,585,354 B2 | 2/2023 | Miller et al. | |
| 2003/0070418 A1 | 4/2003 | Eiler et al. | |
| 2003/0167750 A1 | 9/2003 | Bornhoft et al. | |
| 2005/0252194 A1 | 11/2005 | Orlando et al. | |
| 2009/0139202 A1 | 6/2009 | Agrawal et al. | |
| 2009/0293449 A1 | 12/2009 | Venter | |
| 2010/0154435 A1 | 6/2010 | Exley et al. | |
| 2012/0023891 A1 | 2/2012 | Agrawal et al. | |
| 2012/0233980 A1 | 9/2012 | Heathco | |
| 2014/0250862 A1 | 9/2014 | Suciu et al. | |
| 2015/0113945 A1 | 4/2015 | Suciu et al. | |
| 2017/0284306 A1 | 10/2017 | Negri et al. | |
| 2019/0145322 A1 * | 5/2019 | Sellick | F02C 7/36 |
| | | | 290/52 |
| 2019/0283864 A1 | 9/2019 | Henze | |
| 2023/0073647 A1 | 3/2023 | Glessner et al. | |
| 2023/0383700 A1 | 11/2023 | Hanrahan | |

OTHER PUBLICATIONS

European Search Report dated Dec. 4, 2025, in connection with European Patent Application No. 25189734.4, 9 pages.

* cited by examiner

DIFFERENTIAL DRIVEN OPEN ROTOR WITH BRAKE

TECHNICAL FIELD

This disclosure relates generally to an aircraft propulsion system and, more particularly, to an open rotor propulsion system that is differentially driven and having a rotor brake system.

BACKGROUND

Modern aircraft propulsion systems typically incorporate a gas turbine engine including a core having, in downstream flow order, a compressor section (with rotor blades and stator blades), a combustion section, a turbine section (with rotor blades and stator blades) coupled to the compressor section via a core shaft (or spool), and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases routed from the combustion section to the turbine section. The flow of combustion gases through the turbine section drives the compressor section and the flow is routed through the exhaust section and outward providing thrust (e.g., core thrust).

In some configurations, the gas turbine engine may include a second shaft (or spool) that connects to a second turbine section which rotates independently of the core spool. A second compressor section, a bypass fan or both may be mechanically coupled to the second shaft and driven by the second turbine. In contrast with a single shaft/spool turbine engine, this configuration is typically referred to as a two-spool turbine engine.

In configurations with a bypass fan, the fan includes multiple fan blades which rotate and generate a bypass airflow stream that provides additional thrust (e.g., bypass thrust) for the gas turbine engine. Optional guide vanes may be provided within the engine to direct the bypass airflow from the fan blades, for example, to reduce noise generated by the gas turbine engine and/or enhance performance of the gas turbine engine by converting swirl from the fan blades to additional thrust.

Traditionally, such aircraft propulsion systems with gas turbine engines include an outer nacelle enclosing the gas turbine engine (and its associated sections and fan blades and guide vanes) wherein all (or substantially all) of the airflow (bypass and core flows) occurs within and through the outer nacelle.

Recent aircraft propulsion systems have been designed and are being manufactured with an "open rotor" architecture in which the rotating fan (rotor) blades and the guide vanes are not enclosed within the outer nacelle. By positioning the fan rotor outside the nacelle(s), a larger diameter fan rotor may be utilized which, in turn, increases the mass of the bypass airflow stream (and increases thrust). However, open rotor architectures bring unique safety risks for ground personnel—given the larger rotor/fan diameter and lack of a fan duct (nacelle) surrounding the rotor/fan blades. In addition to the larger diameter fan/rotor, a much larger mass/volume of bypass airflow occurs outside the engine nacelle and over the airfoils and wing. As a result, it is desirable to increase the distance between the fan/rotor and the airfoils and wing. One solution for this is to position the fan rotor further forward with respect to the aircraft. However, this may move the fan rotor closer to a cargo door or other door accessed by ground personnel and, thus, may further increase the safety risks to ground personal caused by the rotating open rotors.

SUMMARY

This disclosure provides apparatus and assemblies for an aircraft propulsion system.

In one embodiment, there is provided an assembly having a gas turbine engine core including a LP compressor section, a HP compressor section, a combustion section, a HP turbine section, a LP turbine section, a HP drive shaft coupled to the HP turbine section and the HP compressor section, and an LP turbine drive shaft coupled to the LP turbine section. The assembly includes a propulsor rotor coupled to a propulsor rotor drive shaft, an LP compressor drive shaft coupled to the LP compressor section, and a powertrain having a first input coupled to the LP turbine drive shaft, a first output coupled to the LP compressor drive shaft, and a second output coupled to the propulsor rotor drive shaft. The powertrain is configured to: transfer power from the LP turbine drive shaft to the propulsor rotor drive shaft and the LP compressor drive shaft during a first mode of operation when a propulsor rotor brake is disengaged, and transfer power from the LP turbine drive shaft to the LP compressor drive shaft during a second mode of operation when the propulsor rotor brake is engaged.

In another embodiment, there is provided an aircraft propulsion system having a core engine defining an engine airflow path. The core engine includes a first spool section having a first compressor, a combustion section, a first turbine and a first spool shaft coupled to the first compressor and the first turbine, a second turbine coupled to an input drive shaft, and a second compressor coupled to a first output drive shaft. An open propulsor rotor with a plurality of rotor blades is disposed near one end of the core engine and coupled to a second output drive shaft. The engine further includes a powertrain assembly coupled to the input drive shaft and the first and second output drives shafts, and the powertrain assembly is configured to: transfer power from the input drive shaft to the first output drive shaft and the second output drive shaft during a first mode, and transfer power from the input drive shaft only to the first output drive shaft during a second mode when the second output drive shaft is prevented from rotating.

In yet another embodiment, there is provided an open rotor engine having a single open propulsor rotor. The engine includes a first compressor, a combustion section, a first turbine and a first drive shaft coupled to the first compressor and the first turbine, a second turbine, a second compressor, and a powertrain. The powertrain is operable or configured to: transfer power received from the second turbine to the single open propulsor rotor and the second compressor during a first mode of operation, and transfer power received from the second turbine to only the second compressor during a second mode of operation.

These and other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented for any suitably arranged engine.

Figure 1A:
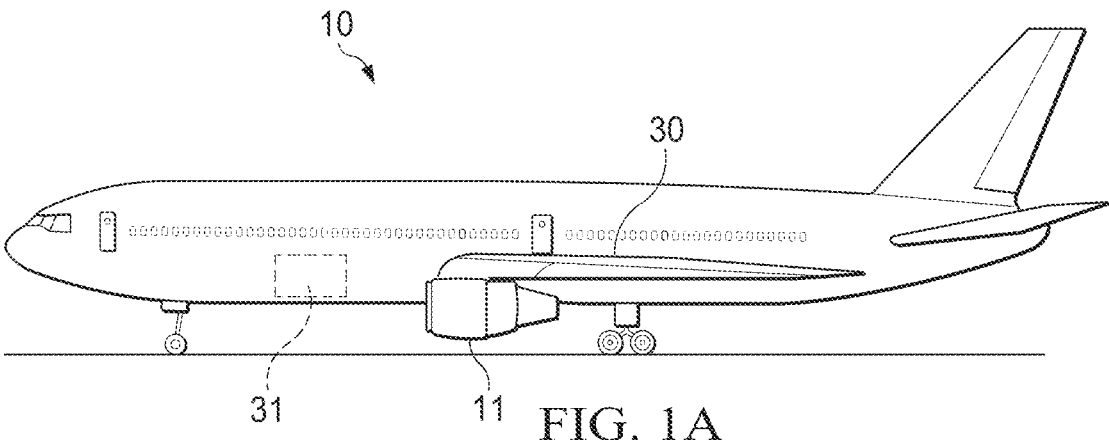
FIG. 1A depicts a commercial passenger aircraft with a typical prior art turbofan engine.
Figure 1B:
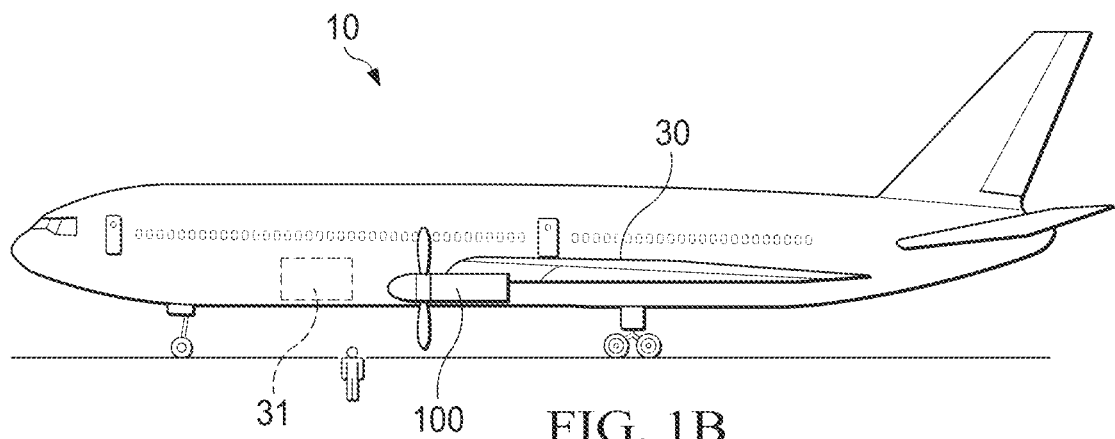
FIG. 1B depicts the same commercial passenger aircraft illustrated in FIG. 1A but shown with an open rotor gas turbine engine in accordance with the present disclosure.

Turning now to FIGS. 1A and 1B, there are depicted a prior art aircraft with a conventional turbofan engine (FIG. 1A) and a similar aircraft with an open rotor gas turbine engine in accordance with the present disclosure (FIG. 1B). FIG. 1A illustrates a side-view of an aircraft 10 illustrating an example prior art gas turbofan engine 11 forming, at least in part, an aircraft propulsion system, the engine 11 being affixed to a wing 30 and shown in relation to a cargo door 31 disposed in the aircraft 10.

FIG. 1B illustrates a side-view of the aircraft 10 but having an aircraft propulsion system 100 with an open rotor gas turbine engine (referred to herein as either "aircraft propulsion system 100" or "open rotor engine 100") in accordance with the present disclosure. The aircraft propulsion system 100 is similarly affixed to the wing 30. As shown, the aircraft propulsion system 100 includes an open rotor extending forward of the wing 30 and positioned closer to the cargo door 31 as compared to the position of prior art engine 11 with respect to the cargo door 31 (see FIG. 1A).

FIGS. 1A and 1B are provided herein to illustrate additional safety risks that may arise when implementing open rotor gas turbines for the propulsion system in aircraft. As previously described, as a result of positioning the fan rotor outside the nacelle(s), a larger diameter fan rotor may be utilized which, in turn, increases the volume of the bypass airflow stream (enabling the same amount of thrust with a lower fan pressure ratio). Due to the larger diameter fan/rotor, a larger mass/volume of bypass airflow occurs outside the engine nacelle and over the airfoils and wing. For performance purposes, it is desirable to increase the distance between the fan/rotor and the airfoils and wing. Increased length of an open rotor gas turbine engine as compared to a gas turbofan engine 11 can also push the large diameter fan/rotor further forward. As shown in FIG. 1B, the fan rotor (and blades) are large, positioned outside any protective nacelle, and located further forward than an inlet of the traditional turbofan engine 11. However, this positioning may increase safety risks to ground personnel caused by the rotating open rotors, such as when ground personnel are accessing a cargo door or other door accessed by ground personnel, such as cargo door 31.

To help alleviate or reduce these risks, the present disclosure describes various embodiments of an aircraft propulsion system (e.g., open rotor engine). In one embodiment, an open rotor engine is configured to isolate or aerodynamically uncouple the open propulsor rotor from its drive mechanism. This enables rotation of the open propulsor rotor to be slowed or stopped during ground operations, thereby reducing the risk of injury or damage to ground personnel in the vicinity. This embodiment and teachings are applicable and may be incorporated into various open rotor engine and propulsion system configurations, such as with a single open rotor, a single open rotor with swirl recovery vane guides, and counter rotating open rotors, as well as in single spool and multiple spool engines, and in forward core and reverse core engines.

The present disclosure describes another embodiment of an aircraft propulsion system (e.g., open rotor engine) configured with a differentially driven open propulsor rotor that enables or allows a rotating propulsor rotor to be stopped by a braking mechanism without adversely affecting the engine. When propulsor rotor rotation is undesirable (parked or stationary), engagement of the braking mechanism slows and stops rotation while the gas turbine power (driving the propulsor rotor) is directed to one or more other rotating assembly(ies) (e.g., the LPC, or some low power extraction structures for extracting power from the rotating spool for use in powering other systems of the aircraft and/or transferring power to a different spool). A typical prop brake cannot be used with an open rotor when directly coupled and geared to a rotating power spool that also powers a compressor (e.g., low speed spool) as stopping the rotor rotation would stop the entire low speed spool rotation including the low compressor. This embodiment and teachings are applicable and may be incorporated into various open rotor engine configurations with a single open rotor and a single open rotor with swirl recovery vane guides, as well as in single spool and multiple spool engines, and in forward and reverse core engines.

Figure 2:
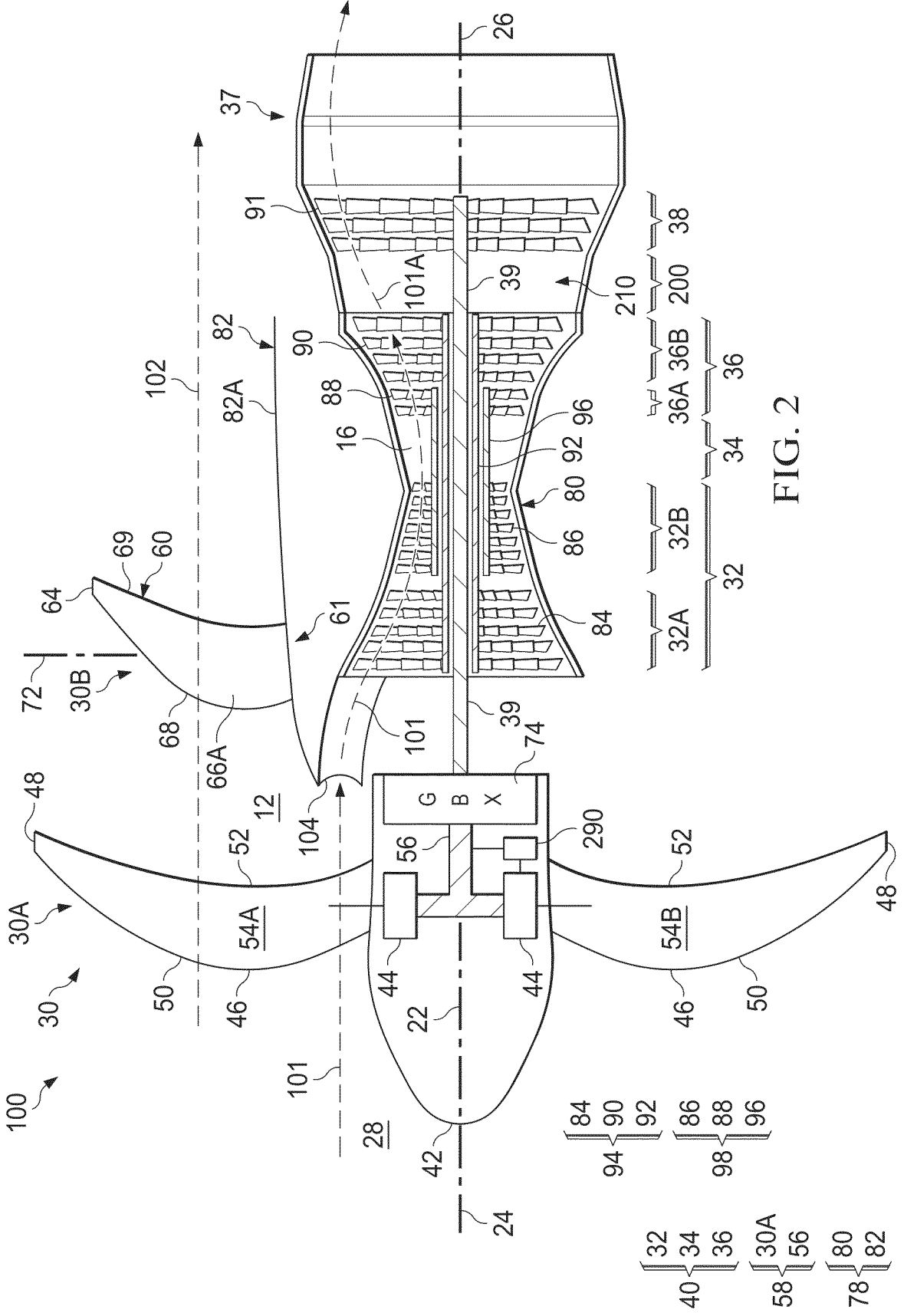
FIG. 2 is a schematic, cross-sectional view of an example open rotor gas turbine engine according to the present disclosure.

Referring now to the drawings, wherein identical numerals indicate the same elements throughout the figures, FIG. 2 is a schematic cross-sectional view of the aircraft propulsion system 100 in accordance with an embodiment of the present disclosure (which may also be hereinafter referred to as "open rotor engine 100"). As shown, the aircraft propulsion system 100 defines an axial direction (extending parallel to a longitudinal centerline 22 provided for reference). The aircraft propulsion system 100 also defines a circumferential direction (not depicted). In general, the aircraft propulsion system 100 includes an open propulsor rotor section 30 configured in mechanical communication and positioned in flow communication with an example core engine 40.

The aircraft 10 may be an airplane, a drone (e.g., an unmanned aerial vehicle (UAV)) or any other manned or unmanned aerial vehicle or system. The propulsion system 100 extends axially along an axis 22 between a forward, upstream end 24 of the propulsion system 100 and an aft, downstream end 26 of the aircraft propulsion system 100. The axis 22 may be a centerline axis of the aircraft propulsion system 100 and/or one or more of its components. The axis 22 may also or alternatively be a rotational axis of one or more components of the propulsion system 100.

The propulsion system 100 is configured as an open rotor propulsion system, for example, a single rotor and swirl recovery vane (SRV) open rotor propulsion system. Here, the term "open" may describe a propulsion system section and/or a propulsion system component that is open to an environment 28 external to an aircraft associated with the aircraft propulsion system 100.

The aircraft propulsion system 100 includes the open rotor propulsion section 30, a compressor section 32, a combustor section 34, and a turbine section 36. The open propulsion section 30 (also referred to as "propulsion module") includes an open propulsor rotor 30A and a swirl recovery vane structure (also referred to as "open guide vane structure") 30B as propulsion module members 30A-30B. The open propulsor rotor 30A (also referred to as "bladed propulsor rotor") is configured as an open rotor (e.g., an un-ducted rotor) which projects radially into and is exposed to the external environment 28. The compressor section 32 includes a low pressure compressor (LPC) section 32A and a high pressure compressor (HPC) section 32B. The turbine section 36 includes a high pressure turbine (HPT) section 36A and a low pressure turbine (LPT) section 36B. The turbine section, in some embodiments, may include a power turbine (PT) section that includes a PT 38 that drives a PT shaft 39. The aircraft propulsion system 100 also includes an exhaust section 37. The aircraft propulsion system 100 includes a propulsor shaft 56, a low speed shaft 92, a high speed shaft 96, and a PT shaft 39 that are rotatable. At least (or only) the LPC section 32A, the HPC section 32B, the combustor section 34, the HPT section 36A and the LPT section 36B, collectively form the gas turbine engine core 40.

The propulsion module members 30A-30B are un-ducted and unshrouded components of the aircraft propulsion system 100. The open propulsion rotor section 30 includes a nose cone 42 disposed at (e.g., on, adjacent or proximate) the propulsion system upstream end 24. The nose cone 42 can be configured as a spinner which is rotatable with the propulsor rotor 30A about the axis 22. Alternatively, the nose cone 42 can be configured as a stationary structure.

The propulsor rotor 30A includes a rotor base 44 (e.g., a disk or a hub) and a plurality of open propulsor blades 46 (e.g., airfoils). The propulsor blades 46 are arranged circumferentially around the rotor base 44 and the axis 22 in an array. Each of the propulsor blades 46 is connected to (e.g., formed integral with or otherwise attached to) the rotor base 44.

Each propulsor blade 46 projects spanwise along a span line of the respective propulsor blade 46 (e.g., radially relative to the axis 22) out from an exterior surface of the rotor base 44, into the external environment 28, to an unshrouded, distal tip 48 of the respective propulsor blade 46. In other embodiments, some or all of the propulsor blades 46 may each be pivotally connected to the rotor base

44. More particularly, some or all of the propulsor blades 46 include a propulsor blade-based (PBB) trunnion (not shown) configured to pivotally connect to the exterior surface of the rotor base 44. Some of or all of the propulsor blades 46 may be configured to pivot about a PBB pivot axis of the respective propulsor blade 46. For example, the PBB trunnion can rotate about the PBB pivot axis to change a pitch angle of the propulsor blade 46, thereby enabling a variable pitch propulsor blade 46.

Each propulsor blade 46 is thereby configured as an un-ducted and unshrouded propulsor blade which is exposed to (e.g., disposed in) the surrounding external environment 28. Each propulsor blade 46 extends longitudinally along a mean line (e.g., a camber line) of the respective propulsor blade 46 from a leading edge 50 of the respective propulsor blade 46 to a trailing edge 52 of the respective propulsor blade 46. Each propulsor blade 46 extends laterally between and to opposing side exterior surfaces 54A and 54B (generally referred to as "54") of the respective propulsor blade 46. The first blade exterior surface 54A may be a concave, pressure side surface of the respective propulsor blade 46. The second blade exterior surface 54B may be a convex, suction side surface of the respective propulsor blade 46. Each of these blade exterior surfaces 54 extends longitudinally along the blade mean line between and meet at the respective blade leading edge 50 and the respective blade trailing edge 52. Each blade element 50, 52, 54A, 54B extends spanwise from the base exterior surface to the respective blade tip 48.

The propulsor rotor 30A is arranged axially along the axis 22 between the nose cone 42 and the SRV structure 30B. The propulsor rotor 30A is arranged axially downstream of the nose cone 42 and axially upstream of the SRV structure 30B. A forward, upstream end of the propulsor rotor 30A may be disposed axially next to (e.g., adjacent, slightly spaced from) an aft, downstream end of the nose cone 42. An aft, downstream end of the propulsor rotor 30A may be disposed axially next to a forward, upstream end of the SRV structure 30B. This disclosure is not limited having a propulsor rotor 30A positioned aft of a nose cone 42. Rather, in some embodiments, the nose cone 42 extends aft of the propulsor rotor 30A with the propulsor blades 46 extending through openings in the nose cone 42.

The propulsor rotor 30A is connected to the propulsor shaft 56. At least (or only) the propulsor rotor 30A and the propulsor shaft 56 collectively form a propulsor rotating assembly 58. This propulsor rotating assembly 58 and its members 30A and 56 are rotatable about the axis 22.

The SRV structure 30B includes a plurality of swirl recovery vanes 60 and an inner platform 61. The swirl recovery vanes 60 are also referred to as airfoils, open guide vanes, guide vanes, or vanes 60. Vanes 60 are stationary, for example, non-rotating with respect to the axis 22. Vanes 60 may be fewer or greater in number than, or the same in number as, the number of propulsor blades 46 and typically greater than two, or greater than four, in number. The guide vanes 60 are arranged circumferentially around the inner platform 61 associated with a nacelle 82 and the axis 22 in an array.

Each guide vane 60 projects spanwise along a span line of the respective guide vane 60 (e.g., radially relative to the axis 22) out from an exterior surface of the inner platform 61 and into the external environment 28 to an unshrouded, distal vane tip 64 of the respective guide vane 60. Each guide vane 60 is thereby configured as an un-ducted and unshrouded guide vane which is exposed to (e.g., disposed in) the surrounding external environment 28. Vanes 60 may have a shorter or longer span than propulsor blades 46. In some embodiments, the span of the vanes 60 is 50% of the span of propulsor blades 46. In some embodiments, one or more of the vanes 60 may have a longer span or the same span as propulsor blades 46 as desired. Each guide vane 60 extends laterally between and to opposing side exterior surfaces 66A (shown) and 66B (not shown). The first vane exterior surface 66A may be a convex, suction side surface of the respective guide vane 60. The second vane exterior surface 66B may be a concave, pressure side surface of the respective guide vane 60. Each of the vane exterior surfaces 66 extends longitudinally along the vane mean line between (and meet at) a respective vane leading edge 68 and a respective vane trailing edge 69. Each guide vane 60 extends longitudinally along a mean line (e.g., a camber line) of the respective guide vane 60 from a leading edge 68 of the respective guide vane 60 to a trailing edge 69 of the respective guide vane 60. Each vane element 66A, 66B, 68, 69 extends spanwise from the inner platform 61 to the respective vane tip 64.

In an example, the vanes 60 are coupled to an exterior surface of the inner platform 61 associated with the engine nacelle 82. In other examples, the vanes 60 may be attached to an aircraft structure associated with the propulsion system 100 or another aircraft structure, such as a wing, pylon, empennage, fuselage, or the like. In some embodiments, each of the guide vanes 60 may be a fixed guide vane which is fixedly connected to the inner platform 61 and/or an internal support structure covered by the inner platform 61. In other embodiments, some or all of the guide vanes 60 may each be a variable guide vane which is pivotally connected to the inner platform 61 and/or an internal support structure covered by the inner platform 61. More particularly, some or all of the guide vanes 60 may include a trunnion (not shown) configured to pivotally connect to the exterior surface of the inner platform 61 of the SRV structure system 30B. Some of or all of the guide vanes 60 may be configured to pivot about a pivot axis 72 of the respective guide vane 60. For example, the trunnion can rotate about the pivot axis 72 to change a pitch angle of the vane 60, thereby enabling a variable pitch vane 60.

The SRV structure 30B is axially downstream of the propulsor rotor 30A. As illustrated in FIG. 2, the SRV structure 30B is arranged axially between the propulsor rotor 30A and one or more sections (e.g., 32-36), or an entirety, of the core engine 40. In some examples, an aft end of the SRV structure 30B may be disposed axially next to, or outboard of, a forward, upstream end of the core engine 40 (for example, relative to fluid flow outside of the core engine 40).

A drivetrain of the aircraft propulsion system 100 includes a gearbox (also referred to as "geartrain") 74 (e.g., a transmission, a speed change device, an epicyclic geartrain, etc.) that is disposed between and operatively couples the propulsor rotating assembly 58 to the power turbine assembly which includes the PT 38 and the PT shaft 39. The gearbox 74 may be optional, and in other embodiments, another gearbox may be included.

In the illustrative example, the engine sections 32A, 32B, 34, 36A, 36B and 38 are arranged sequentially along the axis 22 between the upstream end 24 and the downstream end 26. With this arrangement, each engine section 32A, 32B within the compressor section 32 is arranged axially along the axis 22 between the propulsor section 30 (including propulsion module members 30A-30B) and the combustor section 34. More particularly, the compressor section 32 is arranged axially between the gearbox 74 and the combustor section 34. Other configurations are contemplated herein, such as a reverse flow engine, an off-axis core (e.g., with one or more components of the core engine on an axis angled from axis 22), and/or the like. In FIG. 2, the exhaust section 37 is arranged axially along the axis 22 aft relative to the PT 38. The engine sections 32A, 32B, 34, 36A, 36B, and 38 are housed within a stationary housing (referred to as "propulsion system housing" or "engine housing") 78 of the aircraft propulsion system 100. This propulsion system housing 78 includes a core engine case 80 (e.g., a core case) and the nacelle 82.

The core engine case 80 houses one or more of the propulsion system sections 32A-36B and 38. Each of the engine sections 32A and 32B of the compressor section 32 and the engine sections 36A and 36B of the turbine section 36 includes a respective bladed rotor 84, 86, 88, and 90, respectively. Analogously, the PT 38 includes a bladed rotor 91 that drives the PT shaft 39 which, in turn, drives the propulsor rotor 30A. The LPC section 32A includes one or more low pressure compressor (LPC) rotors 84. The HPC section 32B includes one or more high pressure compressor (HPC) rotors 86. The HPT section 36A includes one or more high pressure turbine (HPT) rotors 88. The LPT section 36B includes one or more low pressure turbine (LPT) rotors 90. The PT 38 includes one or more power turbine (PT) rotors 91. Each of the bladed rotors 84, 86, 88, 90 and 91 is configured as a ducted rotor internal within the aircraft propulsion system 100. That is, each of the bladed rotors 84, 86, 88, 90 and 91 is a ducted and/or shrouded engine rotor. Each of these bladed engine rotors 84, 86, 88, 90 and 91 includes a rotor base (e.g., a disk or a hub) and a plurality of rotor blades (e.g., airfoils, vanes, etc.). The rotor blades are arranged circumferentially around the respective rotor base and the axis 22 in an array. The rotor blades may also be arranged into one or more stages longitudinally along a core engine airflow path 101. Each of the rotor blades is connected to the respective rotor base. Each of the rotor blades projects radially (e.g., spanwise) out from the respective rotor base into the core engine airflow path 101 and to a distal tip of the respective rotor blade. The core case 80 extends axially along (e.g., axially overlaps) and extends circumferentially about (e.g., circumscribes) the engine sections 32A-36B and 38, and their respective bladed rotors 84, 86, 88, 90 and 91. The core engine case 80 may also house the drivetrain (including the gearbox 74).

The LPC rotor 84 is coupled to and rotatable with the LPT rotor 90. For example, the LPC rotor 84 is connected to the LPT rotor 90 through the low speed shaft 92. At least (or only) the LPC rotor 84, the LPT rotor 90 and the low speed shaft 92 collectively form a low speed rotating assembly 94, for example, a low speed spool of the core engine 40. This low speed rotating assembly 94 and its members 84, 90 and 92 are rotatable about the axis 22. Alternatively, the low speed rotating assembly 94 may be rotatable about another axis radially and/or angularly offset from the axis 22.

The HPC rotor 86 is coupled to and rotatable with the HPT rotor 88. For example, the HPC rotor 86 is connected to the HPT rotor 88 through the high speed shaft 96. At least (or only) the HPC rotor 86, the HPT rotor 88 and the high speed shaft 96 collectively form a high speed rotating assembly 98 (for example, a high speed spool of the core engine 40). This high speed rotating assembly 98 and its members 86, 88 and 96 are rotatable about the axis 22. Alternative, the high speed rotating assembly 98 may be rotatable about another axis radially and/or angularly offset from the axis 22.

The nacelle 82 houses and provides an aerodynamic cover over the core engine case 80. An exterior wall 82A of the nacelle 82 is disposed radially outboard of, extends axially along (e.g., axially overlaps) and extends circumferentially about (e.g., circumscribes) the core engine 40 and its case 80. With this arrangement, the bladed rotors 84, 86, 88, 90 and 91 are disposed within the propulsion system housing 78. The propulsor rotor 30A is disposed at least partially (or completely) outside of the propulsion system housing 78. In FIG. 2, the propulsor rotor 30A and the SRV structure 30B are arranged outside of the propulsion system housing 78.

During operation of the aircraft propulsion system 100, the propulsor rotor 30A propels ambient air within the external environment 28 in an aft, downstream direction towards the propulsion system downstream end 26. A major portion (e.g., more than 50%) of this air bypasses the core engine 40 to provide forward thrust while a minor portion (e.g., less than 50%) of the air flows into the core engine 40. For example, this major portion forms an outer stream 102 of bypass air, while this minor portion forms an inner stream 101 of engine core air—referred to as the core engine airflow 101. The outer stream 102 of the air propelled by the propulsor rotor 30A flows axially across an SRV structure 30B of the propulsor section 30 and outside of the propulsion system housing 78 (along the nacelle exterior wall 82A of nacelle 82). The outer stream 102 passes through an intermediate area 12, which is located aft or downstream of the propulsor blades 46 and located upstream of the vanes 60. The bypass air within the intermediate area 12 may exhibit circumferential swirl. The SRV structure 30B is configured to condition (e.g., straighten out) the air propelled by the propulsor rotor 30A to remove or reduce circumferential swirl and thereby enhance the forward thrust. Particularly, the vanes 60 are sized, shaped, and configured to impart a counteracting swirl to the fluid (e.g., air) so that in a downstream direction aft of both propulsor blades 46 and vanes 60 the fluid has a greatly reduced degree of swirl. The reduced degree of swirl translates to an increased level of induced efficiency.

The inner stream 101 of air propelled by the propulsor rotor 30A flows through an airflow inlet 104 of the core engine 40 (the core engine airflow path). The airflow inlet 104 may be configured as an airflow inlet into the core engine 40 or, more generally, the aircraft propulsion system 100. The air entering the core engine airflow path may be referred to as "core air". The core engine airflow path extends longitudinally in the core engine 40 from the airflow inlet 104 sequentially through the LPC section 32A, the HPC section 32B, the combustor section 34, the HPT section 36A and the LPT section 36B.

During operation of the aircraft propulsion system 100, core air is compressed by the LPC rotor(s) 84 and the HPC rotor(s) 86 and directed into a combustion chamber 16 (e.g., an annular combustion chamber) of a combustor (e.g., an annular combustor) in the combustor section 34. Fuel is injected into the combustion chamber 16 and mixed with the compressed core air to provide a fuel-air mixture. This fuel-air mixture is ignited and combustion products of the ignited fuel-air mixture flow through and sequentially drive rotation of the HPT rotor(s) 88 and the LPT rotor(s) 90. The rotation of the HPT rotor(s) 88 and the LPT(s) rotor 90 respectively drive rotation of the HPC rotor(s) 86 and the LPC rotor(s) 84 and, thus, compression of the air received from the airflow inlet 104.

Core engine airflow exhausted or output from the LPT section 36B may drive rotation of the PT 38, which in turn may drive the rotation of the propulsor rotor 30A via the PT shaft 39. For example, the PT shaft 39 can drive the rotation of the propulsor rotor 30A through the drivetrain (including gearbox 74). The rotation of the propulsor rotor 30A, in turn, propels the ambient air within the external environment 28 in the aft, downstream direction. With this arrangement, the core engine 40 and the PT 38 powers operation of (e.g., drives rotation of) the propulsor rotor 30A during aircraft propulsion system operation.

As the combustion gases/flow of the core engine airflow 101 exit the LPT section 36B, the flow at that point will now be referred to as core engine flow 101A.

The core engine flow 101A is then routed through the power turbine 38 where thermal and kinetic energy is extracted from the engine flow via sequential stages of power turbine stator vanes (not shown, coupled to the inner casing 80) and the power turbine rotor blades 91 that are coupled to the power turbine shaft (or spool) 39, thus causing the power turbine shaft 39 to rotate the propulsor rotor 30A. The core engine flow 101A is subsequently routed through the exhaust nozzle section 37 of the aircraft propulsion system 100 to provide propulsive thrust to supplement the propulsive thrust provided by the open propulsor rotor section 30.

As illustrated in FIG. 2, the aircraft propulsion system 100 includes a power turbine isolation system 200 disposed between the LPT section 36B and the power turbine 38. The system 200 includes one or more transition ducts 210 or pathway(s) that extend from the LPT section 36B to the power turbine 38 for directing the core engine flow 101A (in the core engine air flowpath) from the LPT section 36B to the power turbine 38. During normal operation, the core engine flow 101A flows unimpeded through the transition duct 210 into the power turbine 38. In other words, as intended, the core engine flow 101A causes rotation of the power turbine 38 which, in turn, powers and rotates the propulsor rotor 30A.

During operation, there may be occasions or times when it would be desirable to stop rotation of the propulsor rotor 30A, such as when the aircraft is parked with the engine still operating (e.g., ground idle) and ground personnel are (or will be) in the immediate vicinity of the aircraft (such as for fueling, cargo/luggage loading and unloading, maintenance, etc.) and near the rotating propulsor rotor 30A. As will be appreciated, the power turbine isolation system 200 described herein, as part of the aircraft propulsion system 100, functions to isolate, remove or otherwise decouple power from the propulsor rotor 30A thereby stopping rotation. It does this by blocking flow to the power turbine 38. As will be more fully described below, the system 200 prevents, blocks or otherwise stops most or all of the combustion gases exiting the LPT section 36B from flowing into the power turbine 38. As a result, little or no core engine flow 101A enters the power turbine 38 effectively slowing and stopping rotation of the power turbine 38 and the propulsor rotor 30A.

In one embodiment, the power turbine isolation system 200 includes one or more flow diverters 220 (e.g., FIGS. 3A, 3B) disposed within or about the transition duct 210. In one embodiment, the flow diverter 220 functions to cause the core engine flow 101A exiting the LPT section 36B to bypass (or be diverted from) the power turbine 38. When configured in this bypass or diverter mode, there is little or no rotation (rotation is prevented or substantially reduced) of the power turbine 38 which results in little or no rotation of the propulsor rotor 30A. In normal operation when rotation is desired, the flow diverter 220 is disposed in a first position that allows the core engine flow 101A into the power turbine 38. When no rotation is desired, the flow diverter 220 is placed in a second position causing diversion of all (or substantially all) of the core engine flow 101A through another path (bypass path) so as to block or stop the core engine flow 101A from flowing into the power turbine 38. In other words, the flow diverter 220 is configured to either direct the core engine flow 101A (exiting the LPT section 36B) along or through a first path to the power turbine 38 or along or through a second path to effectively bypass the power turbine 38.

In one embodiment, the transition duct 210 includes one or more bypass paths 222 (e.g., FIGS. 3A, 3B) e.g., openings, or other duct(s), through which the core engine flow 101A is directed for bypassing the power turbine 38. The flow diverter 220 may be any suitable structure or mechanism operably configured to (1) allow or direct the core engine flow 101A to the power turbine 38 while simultaneously blocking or closing all of the one or more bypass paths (normal operation/mode), and (2) stop or block all (or substantially all) of the core engine flow 101A from reaching the power turbine 38 and simultaneously direct the core engine flow 101A through one or more bypass paths 222 (bypass operation/mode). The flow diverter 220 disposed in the transition duct 210 between the LPT section 36B and the power turbine 38 allows the core engine flow 101A to bypass the power turbine 38 which prevents or significantly reduces rotation of the propulsor rotor 30A when thrust (or rotation) is not desired, such as during ground operation. As may be appreciated, there are other times when power to the propulsor rotor 30A may be removed or is not otherwise desired (and the engine/system 100 is placed in the bypass operation), e.g., during aircraft descent and/or after landing (e.g., on rollout) which may assist in slowing forward velocity and/or saving power (and fuel) or during a failure condition where the propulsor rotor 30A experiences an imbalance condition.

In one embodiment, the flow diverter 220 may be structured and configured as a blocker door. When in a first configuration, the blocker door 220 blocks the core engine flow 101A from flowing to the one or more bypass paths 222 and the core engine flow 101A flows to and through the power turbine 38. And, when in a second configuration, the blocker door 220 blocks the core engine flow 101A from flowing to the power turbine 38 and the core engine flow 101A flows to and through the one or more bypass paths 222. In an embodiment, the power turbine isolation system 200 may be similar to a conventional thrust reverser system as known in the art, but in the present disclosure, this section is incorporated between the LPT section 36B and the power turbine 38. In such embodiment, the system 200 may function both as a conventional thrust reverser and a power turbine isolation system as described herein.

Again referring to FIG. 2, the aircraft propulsion system 100 includes an optional brake mechanism 290 configured to apply a braking function for inhibiting (e.g., slowing, stopping) rotation of the propulsor rotor 30A when no rotation is desired, and in one example, during ground idle. In embodiments, the brake mechanism 290 may apply frictional force to the gear box 74 (which couples the propulsor rotor 30A and shaft 56 to the power turbine shaft/spool 39). As will be appreciated, in other embodiments, the brake mechanism 290 may be disposed and implemented at different locations and apply the frictional force to any component or part of the shaft/spool 39, the gearbox 74, the propulsor shaft 56 or the propulsor rotor 30A, as desired. In any case, the brake mechanism 290 operably functions to inhibit (e.g., slow, stop) rotation of the propulsor rotor 30A, or otherwise hold the propulsor rotor 30A from rotating. It will be understood that the brake mechanism may be any type of brake assembly, including any types typically utilized in such applications, and may further be mechanical with brake rotor(s) or drum(s), and which could be actuated mechanically, electrically or hydraulically, or some combination thereof.

In an embodiment, the brake mechanism 290 is operable and the braking force may be applied at any time, as desired. However, activation of the braking mechanism 290 and application of braking may be detrimental or undesirable during one or more time periods. For example, during normal operation/mode of the system 100, it would generally be detrimental to enable or apply the braking as rotational power is applied to the propulsor rotor 30A via the power turbine 38. In one embodiment, the brake mechanism 290 can only be activated while the system/engine 100 is operating in the bypass operation/mode-after the flow diverter 220 is placed in the second position and all (or substantially all) of the core engine flow 101A is diverted through the bypass paths 222. In addition, there may be times during which the system/engine 100 is placed and operates in the bypass operation/mode (e.g., for descent, landing at which times the propulsor rotor 30A may be disengaged and providing no forward thrust) but in which it may be undesirable to apply braking that stops rotation of the propulsor rotor 30A (e.g., during descent or after landing, passengers may be disturbed upon seeing no visible rotation of the propulsor rotor 30A). Thus, there may be times during which activation of the brake mechanism 290 is undesirable and should be prevented from being activated.

In other embodiments, the brake mechanism 290 may be configured to operate only when the aircraft or the propulsion system is on the ground. This may be implemented or controlled by inclusion of a weight on wheels switch or landing gear or power control lever position logic, or other similar functionality or suitable control mechanism(s).

Although FIG. 2 illustrates the aircraft propulsion system 100 in a three-spool configuration (having an LPT section, an HPT section, and a free/power turbine), the teachings and descriptions herein are equally applicable to and may be incorporated into open rotor engines and designs that have a greater or lesser number of spools. For example, in another embodiment having a two spool configuration, the system 100 shown in FIG. 2 may omit the low speed spool (LPC section, shaft, and LPT section) and the engine core flow exiting the HPT section would next flow into the free/power turbine 38. Optionally, the LPC section 32A may be retained and mechanically coupled to the power turbine shaft 39 such that it is operably linked to the power turbine 38 and the propulsor rotor 30A. In this embodiment, the HP shaft or spool 92 may continue to operate while the power turbine shaft 38, the LPC section 32A and the propulsor rotor 30A remain static or substantially static. If desired or needed, a bleed typically located between the LPC section 32A and the HPC section 32B may serve as an inlet to provide flow into the HPC section.

In addition, the aircraft propulsion system 100 in FIG. 2 is illustrated in a tractor propulsor configuration in which the propulsor rotor section 30 is disposed upstream of the core engine 40. The teachings and descriptions herein are equally applicable to and may be incorporated into open rotor engines in pusher propulsor configurations. For example, in another embodiment in a pusher propulsor configuration, the propulsor rotor section 30 is disposed downstream of the core engine 40. Other minor modifications may be necessary to implement a pusher configuration, however, those skilled in the art would readily understand how to make such modifications.

In addition, the aircraft propulsion system 100 in FIG. 2 is illustrated in a forward core configuration in which the compressor section is disposed upstream (as compared to the bypass flow) of the combustor section 34. The teachings and descriptions herein are equally applicable to and may be incorporated into open rotor engines in reverse core configurations. For example, in another embodiment in a reverse core configuration, the compressor section is disposed downstream (as compared to the bypass flow) of the combustor section 34. In such a reverse core configuration, the first portion of air 101 (core flow) flows in the opposite direction as the second portion of air 102 (bypass flow). Other minor modifications may be necessary to implement a reverse configuration, however, those skilled in the art would readily understand how to make such modifications.

Further, in addition to the aircraft propulsion system 100 illustrated in FIG. 2 as being symmetrical about the longitudinal centerline or axis 22, the system/engine 100 may be implemented in different configurations, including various configurations in the form of an offset core or angled core.

Figure 3A:
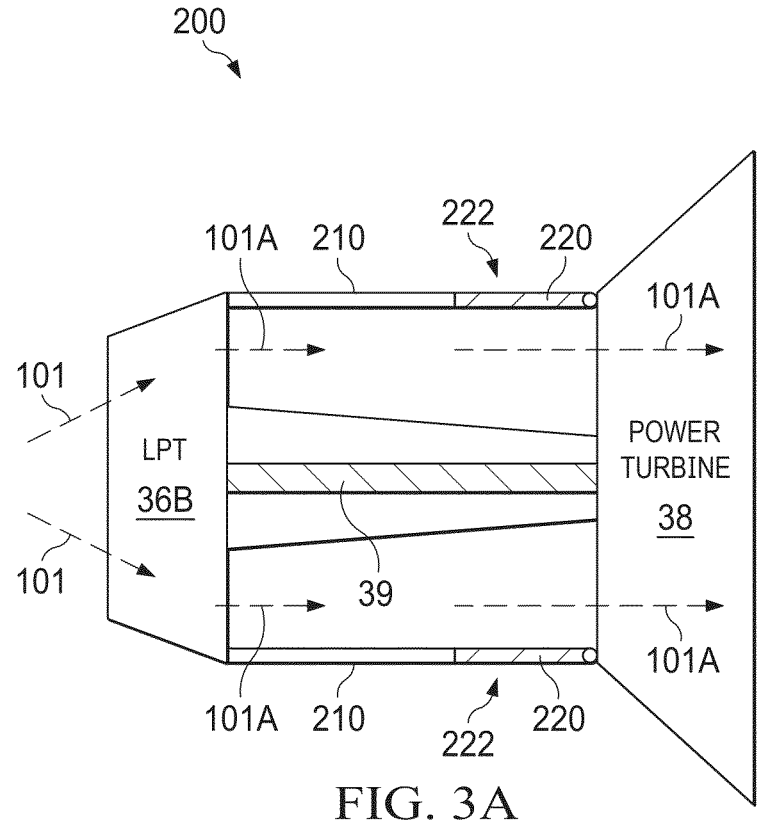
FIG. 3A is a more detailed schematic illustration or block diagram of the power turbine isolation system shown in FIG. 2 in one position (normal operation/mode)
Figure 3B:
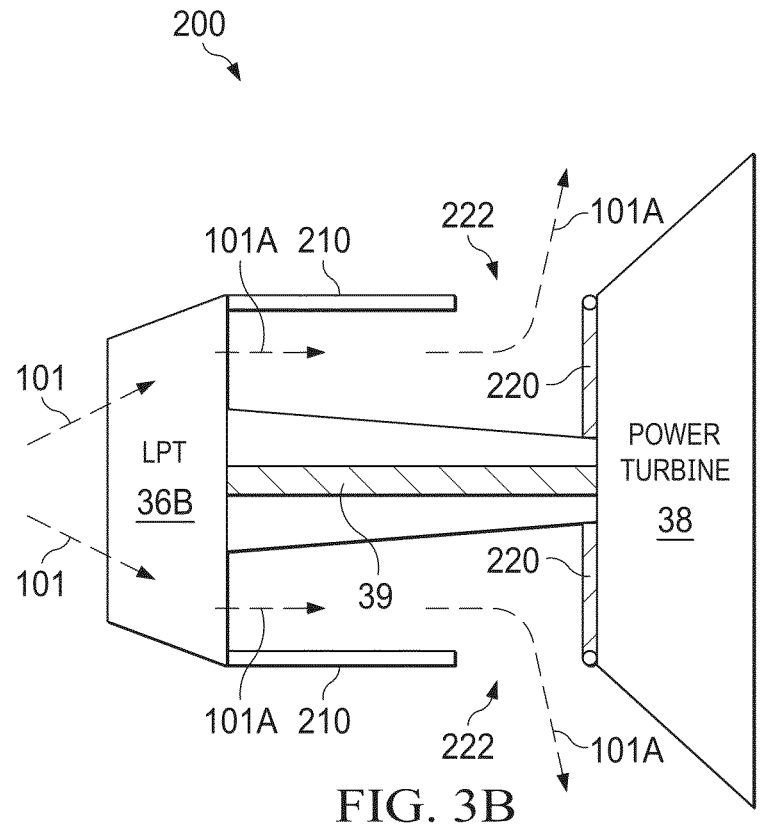
FIG. 3B is a more detailed schematic illustration or block diagram of the power turbine isolation system shown in FIG. 2 in a second position (bypass operation/mode)

Now turning to FIGS. 3A and 3B, there are illustrated more detailed diagrams of one embodiment of the power turbine isolation system 200 shown in FIG. 2. FIG. 3A illustrates engine normal operation/mode in which the core engine flow 101A is directed to and through the power turbine 38—applying power to the propulsor rotor 30A. FIG. 3B illustrates engine bypass operation/mode in which the core engine flow 101A bypasses the power turbine 38 and is directed to and through the openings 222 of the transition duct 210—removing power from the propulsor rotor 30A.

As illustrated, the system 200 is disposed between the exit end of the LPT section 36B and the entrance end of the power turbine section 38. The transition duct 210 includes one or more openings or bypass paths 222, such as one or more openings formed in the walls of the duct 210 for exhausting the core engine flow 101A directly to the outside. Alternatively, the transition duct 210 may include one or more extension ducts (not shown) whereby the core engine flow 101A through the openings/paths 222 is directed through the one or more extension ducts (not shown) along a desired path prior to release and exhausting to the outside.

Turning now to FIG. 3A, the flow diverter (or blocker) 220 is shown in a first position. In this first position, the openings or bypass paths 222 are blocked/shut and the core engine flow 101A is directed to and through the power turbine 38 causing the power turbine 38 and the coupled shaft/spool 39 to rotate. In turn, this causes the propulsor rotor 30A to rotate.

Turning now to FIG. 3B, the flow diverter (or blocker) 220 is shown in a second position. In this second position, the openings or bypass paths 222 are unblocked/open causing the core engine flow 101A to be directed to and through the openings or bypass paths 222 and preventing flow through the power turbine 38. This removes or eliminates the power/flow needed to cause rotation of the power turbine 38. As a result, no rotational power is applied to the shaft/spool 39 and, in turn, no rotational power is applied to the propulsor rotor 30A.

Figure 4:
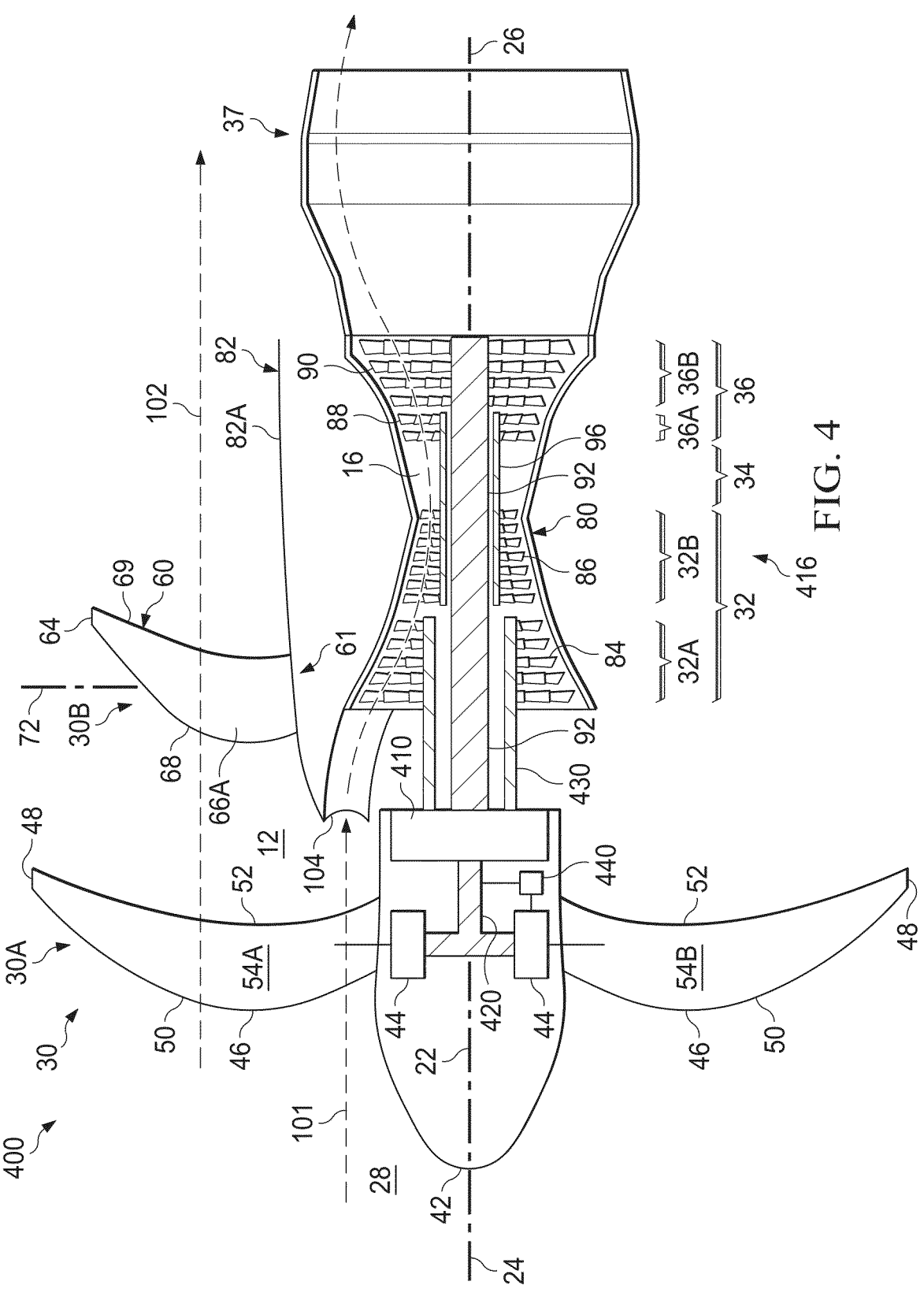
FIG. 4 is a schematic cross-sectional view of another example open rotor gas turbine engine according to the present disclosure.

Turning now to FIG. 4, there is shown a schematic cross-sectional view of an aircraft propulsion system 400 (or sometimes referred to as a "open rotor engine") in accordance with another embodiment of the present disclosure (which will be hereinafter referred to as "aircraft propulsion system 400"). The aircraft propulsion system 400 is similar to the aircraft propulsion system 100 of FIG. 2 (and described above) but is configured without a free turbine (e.g., 38) and includes a differentially driven open propulsor rotor that enables or allows the rotating propulsor rotor to be stopped by a braking mechanism without adversely affecting the engine. In this embodiment, various differences are illustrated as compared to the aircraft propulsion system 100 of FIG. 2, including incorporation of a differential-type powertrain and drive assembly 410 (also referred to herein as "powertrain 410") coupled to the LPT section 36B, the open propulsor rotor 30A and the LPC section 32A. Additional components or parts of the aircraft propulsion system 400 that are necessary for an understanding of this embodiment (as compared to the embodiment of FIG. 2) are shown in FIG. 4 (and FIGS. 5-8) and described further below.

As shown, the aircraft propulsion system 400 defines an axial direction (extending parallel to a longitudinal centerline or axis 22 provided for reference). The aircraft propulsion system 400 also defines a circumferential direction (not depicted). In general, the aircraft propulsion system 400 includes the propulsor rotor section 30 configured in mechanical communication and positioned in flow communication with an example core engine 416.

The core engine 416 is depicted generally as a two spool engine with a compressor section and a turbine section each having a low pressure section and a high pressure section—similar to the core engine 40 of FIG. 2. At least (or only) the LPC section 32A, the HPC section 32B, the combustor section 34, the HPT section 36A and the LPT section 36B, collectively form the gas turbine engine core 416. Instead of the low pressure configuration shown in FIG. 2, the LP shaft or spool 92 drivingly connects the LPT section 36B to the powertrain 410.

As will be appreciated, the aircraft propulsion system 400 may also include one or more additional turbine sections (not shown) disposed downstream of the LPT section 36B and function to provide rotational power to another device or assembly (not shown) and used for other than driving the propulsor rotor 30A and the LPC section 32A.

In some embodiments, the aircraft propulsion system 400 may include adjustable (variable pitch) or fixed rotor blades 46 and may optionally include circumferentially spaced outlet guide vanes 60, as described above with respect to the embodiments of FIG. 2.

In the embodiment depicted in FIG. 4, the propulsor rotor section 30 includes the propulsor rotor 30A and the plurality of rotor blades that are together rotatable about the longitudinal centerline 22 via an open rotor drive shaft 420 that drivingly connects (couples) the powertrain 410 to the propulsor rotor 30A. The aircraft propulsion system 400 further includes an LPC drive shaft 430 that drivingly connects (couples) the powertrain 410 to the LPC section 32A. The powertrain 410 includes a plurality of gears (not shown in FIG. 4) and is configured to provide or couple rotational power input from the LP turbine shaft 92 to (1) both the open rotor drive shaft 420 (and to the propulsor rotor 30A) and the LPC drive shaft 430 (and to the LPC section 32A) in a first mode (e.g., open mode); and (2) only the LPC drive shaft 430 (and to the LPC section 32A) in a second mode (e.g., star mode). In the star mode, the open rotor drive shaft 420 is rotationally decoupled (stationary) from the LP turbine shaft 92.

Referring again to FIG. 4, the aircraft propulsion system 400 includes a brake system 440 (including an open rotor brake) configured to selectively engage and brake (e.g., slow or stop) rotation of the propulsor rotor 30A by applying a braking force to the open rotor drive shaft 420. However, the brake system 440 may alternatively be arranged to apply the braking force to any other system element coupled to the open rotor drive shaft 420 (e.g., other component(s) in the powertrain 410 coupled to the drive shaft 420). The brake system 440 may be the same or similar to the brake mechanism 290 of FIG. 2. The brake system 440 is configured to apply a braking function for inhibiting (e.g., slowing, stopping) rotation of the propulsor rotor 30A when no rotation is desired, and in one example, during ground idle.

In another embodiment, the brake system 440 is operable and the braking force may be applied at any time, as desired.

The brake system 440 is illustrated as applying frictional force to the open rotor drive shaft 420 (which is coupled to the propulsor rotor 30A). As will be appreciated, the brake system 440 may be disposed and implemented at different locations and apply the frictional force to any component or part of the rotor drive shaft 420, the propulsor rotor 30A, or the powertrain 410. In any case, the brake system 440 operably functions to inhibit (e.g., slow, stop) rotation of the propulsor rotor 30A, or otherwise hold it from rotating. It will be understood that the brake system 440 may be any type of brake or brake assembly, including any types typically utilized in such applications, and may further be mechanical with brake rotor(s) or drum(s), and which could be actuated mechanically, electrically or hydraulically, or some combination thereof.

As noted above, there may be occasions or times when it would be desirable to stop rotation of the propulsor rotor 30A, such as when the aircraft is parked or otherwise stationary with the engine still operating (e.g., ground idle) and ground personnel are (or will be) in the immediate vicinity of the aircraft (such as for fueling, cargo/luggage loading and unloading, maintenance, etc.) and near the rotating propulsor rotor 30A. As will be appreciated, the powertrain 410 is configured to decouple power to the propulsor rotor 30A during engagement of the brake system 440 which slows and stops its rotation. Selective engagement of the brake system 440 slows and eventually stops rotation of the propulsor rotor 30A while the powertrain 410 transfers the input rotational power from the LPT section 36B to the LPC section 32A.

As will be appreciated, the powertrain 410 enables implementation and inclusion of the brake system 440 on the propulsor rotor 30A so that when braking is applied all power from the LP turbine may be directed to the LP compressor 32A. This stops rotation of the propulsor rotor 30A when desired. The powertrain 410 and the brake system 440 provide increased safety for ground personnel by stopping rotation of the propulsor rotor 30A during ground idle. The powertrain 410 also enables the propulsor rotor 30A and LPC section 32A operating speeds (RPM) to vary independently as rotor blade pitch and/or LPC inlet guide vanes (IGVs) pitch is varied. This allows for additional control of LPC section 32A operability over a smaller range of propulsor rotor 30A speeds. Although not specifically shown in FIG. 4, the aircraft propulsion system 400 may optionally include a plurality of IGVs disposed within or near the LPC section 32A. This may also allow for a reduction in core engine airflow (or intake) during the second mode of operation. Also, although not specifically shown, the aircraft propulsion system 400 may include an intake diverter as another way of reducing the core engine airflow.

In one embodiment, the powertrain 410 is configured as a planetary differential gear mechanism which enables the LPT section 36B to drive both the propulsor rotor 30A and the LPC section 32A. The LPT section 36B and shaft (low speed) 92 are coupled to a differential gearset (e.g., a sun gear) in the powertrain 410. The LPC section 32A and the LPC drive shaft 430 are driven by and coupled to a differential output (e.g., a differential ring gear) in the powertrain 410. The propulsor rotor 30A and rotor drive shaft 420 are coupled to a differential carrier output (e.g., a differential planet gear and carrier) in the powertrain 410. However, when braking is applied (enabled), the differential planet gear carrier does not rotate and the rotor drive shaft 420 as well as the propulsor rotor 30A do not rotate. As a result, all of the rotational power input to the powertrain 410 is directed to the LPC section 32A.

As will be appreciated, in addition to ground idle, there may be other times when power to the propulsor rotor 30A may be removed or is not otherwise desired (and the engine 400 is placed in the star mode), e.g., during aircraft descent idle to reduce load on the core engine and reduce fuel consumption or during a failure condition where the propulsor rotor 30A experiences an imbalance condition.

Figure 5A:
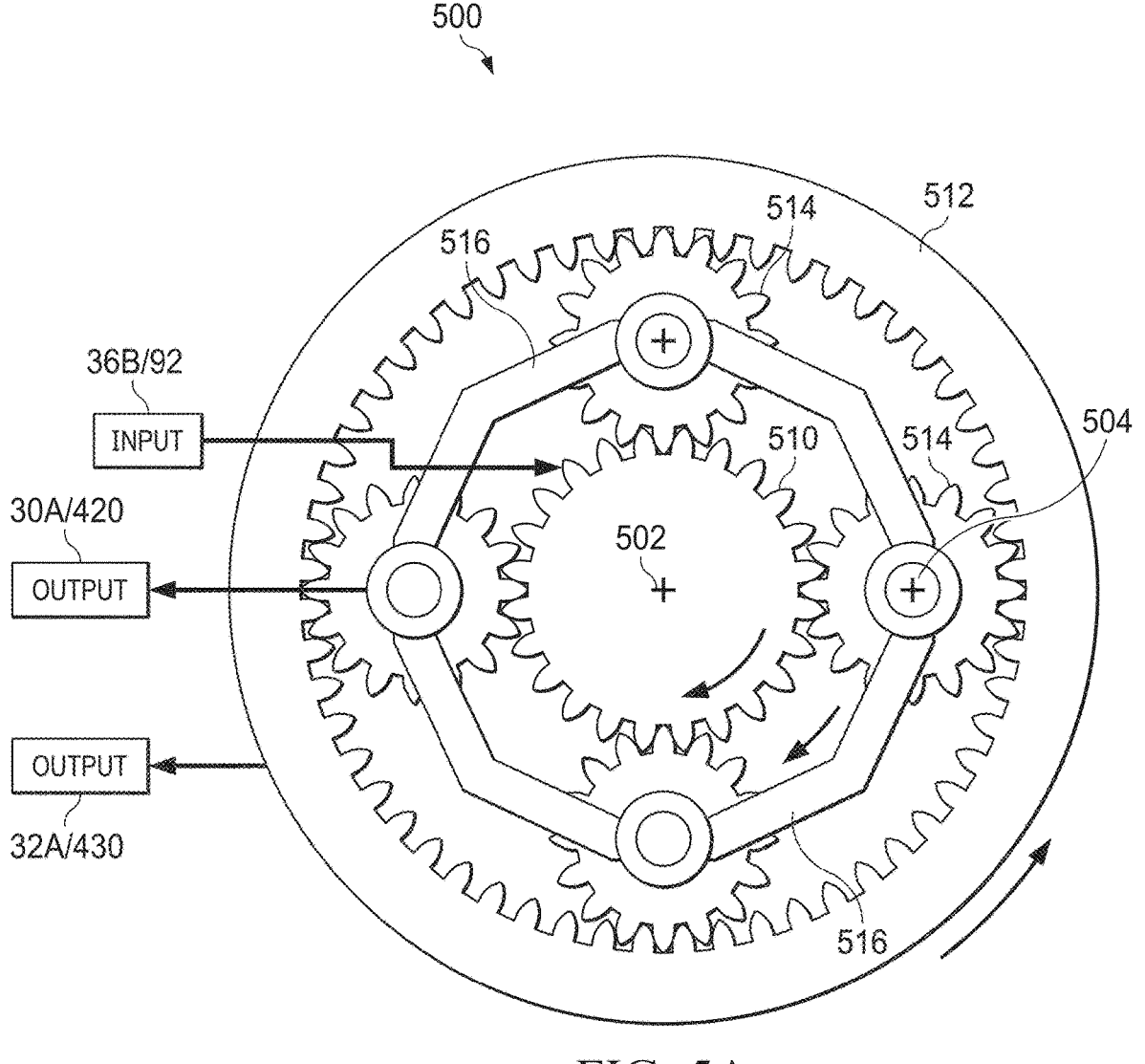
FIG. 5A is a schematic illustration of the geartrain coupled between the input and the outputs, and depicting operation in an open or differential mode.
Figure 5B:
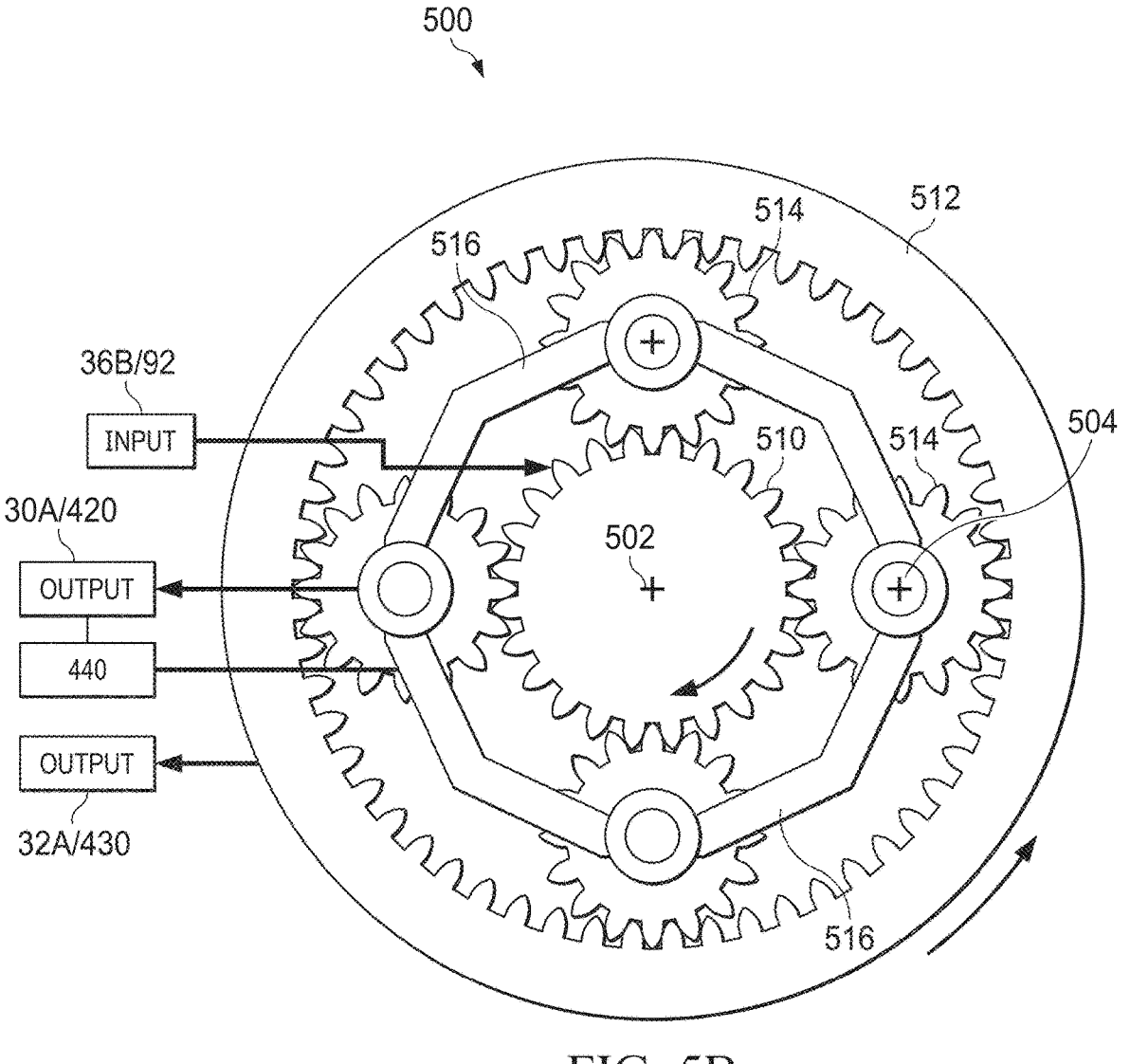
FIG. 5B is a schematic illustration of the geartrain coupled between the input and the outputs, and depicting operation in a star mode.

Now turning to FIGS. 5A and 5B (and with continued reference to FIG. 4), there is shown an example, configuration or embodiment of the powertrain 410. As shown in FIG. 4, the powertrain 410 is configured to couple the LPT shaft 92 to the propulsor rotor 30A and to the LPC section 32A. Although not shown, the aircraft propulsion system 400 may include one or more additional drive shafts, transmissions, or gear systems/boxes disposed between (or within) the powertrain 410 and the propulsor rotor 30A and the LPC section 32A for gear reduction, etc.

As shown in FIGS. 5A and 5B, the powertrain 410 includes a geartrain 500. The geartrain 500 may be configured as an epicyclic geartrain. This geartrain 500 may be operable in an open or differential mode of operation (normal operation); e.g., see FIG. 5A. The geartrain 500 may be operable in a star mode of operation (ground idle operation); e.g., see FIG. 5B.

The geartrain 500 includes an inner sun gear 510, an outer ring gear 512, one or more intermediate gears 514 (e.g., planet or star gears) and a carrier 516. The gears 514 and the carrier 516 collectively form a fan drive gear system ("FDGS") which is coupled to the propulsor rotor drive shaft 420. The sun gear 510 is rotatable about a centerline axis 502 of the geartrain 500. The ring gear 512 is rotatable about the centerline axis 502 during both the open/differential mode of operation and the star mode of operation. The ring gear 512 extends circumferentially around (e.g., circumscribes) the sun gear 510 and an annular array of the intermediate gears 514. The intermediate gears 514 are arranged circumferentially about the centerline axis 502 in the annular array. Each of the intermediate gears 514 is radially between and meshed with the sun gear 510 and the ring gear 512. Each of the intermediate gears 514 is rotatable about a respective intermediate gear axis 504, and is rotatably mounted to and supported by the carrier 516. The carrier 516 is non-rotatable about the centerline axis 502 during at least (or only) the star mode of operation.

Other suitable configurations of the gearset 500 (other differential-type gearsets or systems) may be implemented provided the operation is consistent with that described herein for the two modes of operation.

During the differential or open mode of operation of FIG. 5A, the carrier 516 of the FDGS is not braked (and is allowed to rotate) and the geartrain 500 transfers a first portion of the power received from the LPT shaft 92 to the propulsor rotor 30A and a second portion of the power to the LPC section 32A. The geartrain 510 therefore transfers (e.g., all, minus powertrain losses) power received from the LPT section 36B to rotate both the LPC section 32A and the propulsor rotor 30A. Reference arrows are shown illustrating rotation of the respective sun gear 510, ring gear 512 and FDGS (the planet gears 514 also rotate counterclockwise).

During the star mode of operation of FIG. 5B, the carrier 516 of the FDGS is held stationary (non-rotating) by application of the brake 440, and the geartrain 500 transfers all of the power received from the LPT shaft 92 to the LPC section 32A since the carrier 516 is stationary. The geartrain 510 therefore transfers (e.g., all, minus powertrain losses) power received from the LPT section 36B to rotate the LPC section 32A. Reference arrows are shown illustrating rotation of the respective sun gear 510 and ring gear 512, while the carrier 516 is stationary (with the planet gears 514 rotating counterclockwise).

In other words, the two modes of operation illustrated by FIGS. 5A and 5B provide: when the brake 440 is disengaged, power from the LPT section 36B (via LPT shaft 92) is distributed to (or split between) the propulsor rotor 30A (via open rotor drive shaft 420) and the LPC section 32A (via LPC drive shaft 430); and when the brake 440 is engaged, power from the LPT section 36B (via LPT shaft 92) is selectively distributed only to the LPC section 32A (via LPC drive shaft 430).

Figure 6:
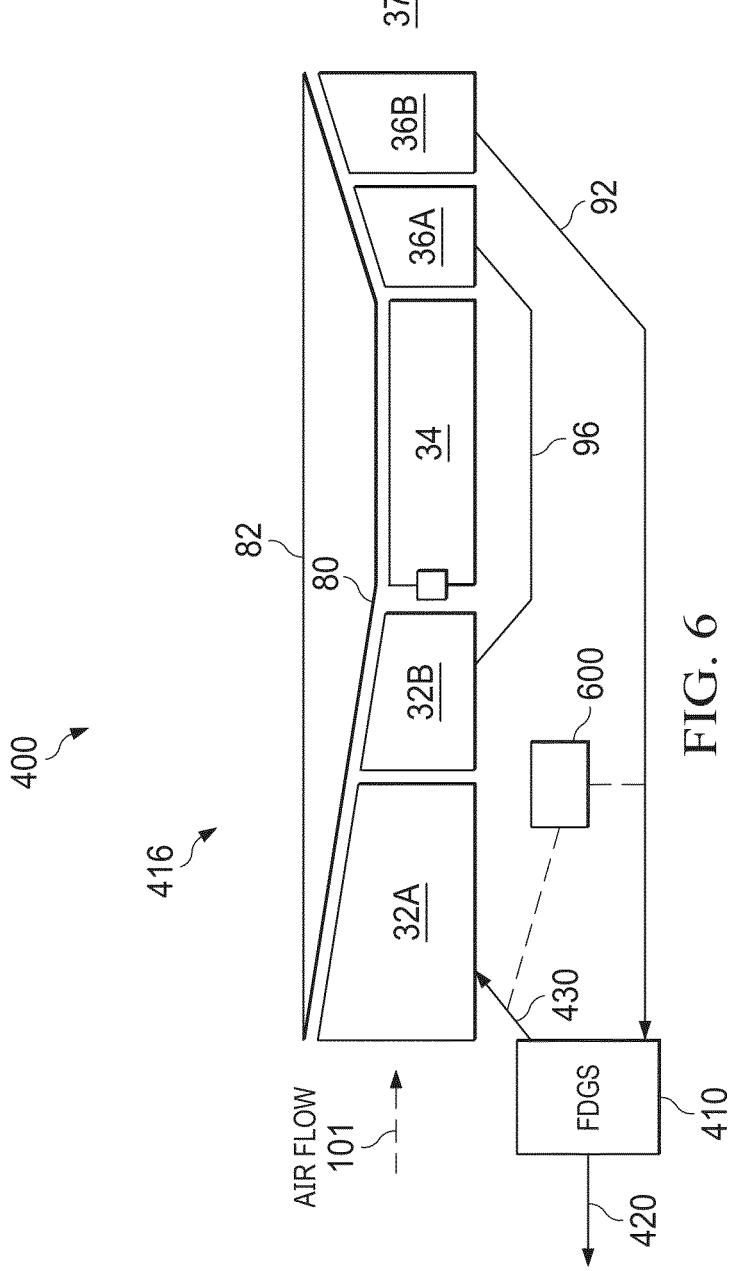
FIG. 6 is a partial schematic diagram of the engine of FIG. 4 and illustrating the core engine and the powertrain and related components.

Now turning to FIG. 6, there is shown a partial schematic diagram of the aircraft propulsion system 400 further illustrating the core engine 416 and the powertrain 410 and related components. In the star mode, the LPT section 36B could provide far more power than the LPC section 32A needs alone. Aero isolation helps reduce the power created by the LPT section 36B to help prevent over-speeding the LPC section 32A. However, a second load 600 driven by the LPC drive shaft 430 and/or the LPT shaft 92 could also assist to prevent this over-speeding. The load 600 may be a generator, other electrical load, a mechanical load, or other mechanical power transfer to a load. As will be appreciated, more than one load 600 may be included. A generator may be used to power the aircraft, charge a battery, or in a hybrid application transfer power to the HP spool. Similarly, a mechanical load may power accessories, or mechanically transfer power thru a geartrain to the HP spool.

Figure 7:
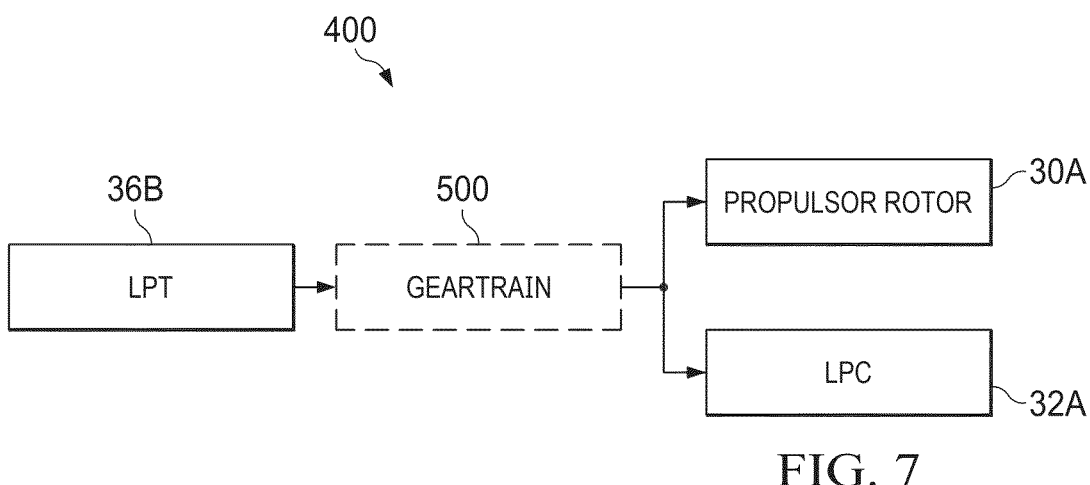
FIG. 7 is a partial schematic representation of the relationship among the geartrain, the low pressure turbine (LPT) section, the propulsor rotor and the low pressure compressor (LPC) section of FIG. 4.

Now turning to FIG. 7, there is shown a partial schematic representation of the relationship among the geartrain 500 (of the powertrain 410), the LPT section 36B, the propulsor rotor 30A and the LPC section 32A.

Figure 8:
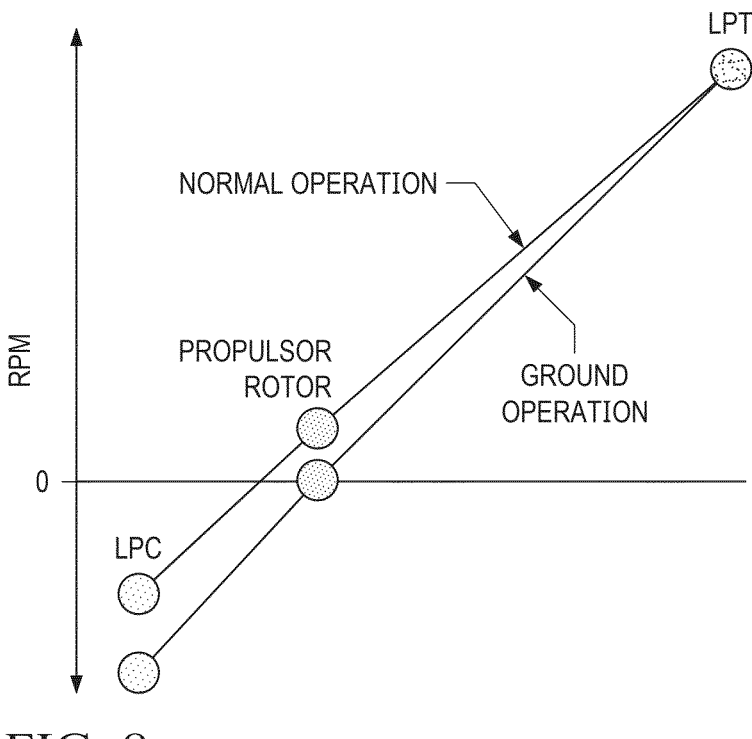
FIG. 8 is an example graph illustrating the operational rotations per minute (RPMs) of the LPT section, the propulsor rotor and the LPC section of FIG. 4 in the two modes of operation.

Now turning to FIG. 8, there is illustrated an example graph illustrating the operational RPMs of the LPT section 36B, the propulsor rotor 30A and the LPC section 32A. In the open mode of operation (normal operation), both the propulsor rotor 30A and LPC section 32A are rotating, while in the star mode of operation (ground idle operation), only the LPC section 32A is rotating. In both modes, of course, the LPT section 36B is rotating and providing power to the powertrain 410. It will be understood that the RPMs of the propulsor rotor 30A and the LPC section 32A as compared to that of the LPT section 36B can be any suitable ratio(s) and dependent on the particular desired application. Thus, the gear(s) and ratio(s) chosen and the rotational speed of the components are within the knowledge of those skilled in the art.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

It may be advantageous to set forth definitions of certain words and phrases that may be used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An assembly for an aircraft propulsion system, comprising:

a gas turbine engine core including a low pressure (LP) compressor section, a high pressure (HP) compressor section, a combustion section, a HP turbine section, a LP turbine section, a HP drive shaft coupled to the HP turbine section and the HP compressor section, and an LP turbine drive shaft coupled to the LP turbine section;

a propulsor rotor coupled to a propulsor rotor drive shaft;

an LP compressor drive shaft coupled to the LP compressor section;

a powertrain comprising, a first input coupled to the LP turbine drive shaft, a first output coupled to the LP compressor drive shaft, and a second output coupled to the propulsor rotor drive shaft; and the powertrain configured to:

transfer power from the LP turbine drive shaft to the propulsor rotor drive shaft and the LP compressor drive shaft during a first mode of operation when a propulsor rotor brake is disengaged, and transfer power from the LP turbine drive shaft to the LP compressor drive shaft during a second mode of operation when the propulsor rotor brake is engaged.

2. The assembly in accordance with claim 1, wherein the powertrain further comprises:

an epicyclic gearset.

3. The assembly in accordance with claim 1, wherein the powertrain further comprises:

a sun gear rotatable about a centerline axis;

a ring gear circumscribing the sun gear and rotatable about the centerline axis;

a plurality of intermediate gears arranged circumferentially about the centerline axis, each of the plurality of intermediate gears meshed between the sun gear and the ring gear; and a carrier rotatable about the centerline axis, each of the plurality of intermediate gears rotatably mounted to the carrier.

4. The assembly in accordance with claim 3 wherein, when in the first mode of operation, the sun gear rotates about the centerline axis in a first direction, the ring gear rotates about the centerline axis in a second direction opposite the first direction, and the carrier rotates about the centerline axis in the first direction.

5. The assembly in accordance with claim 3 wherein, when in the second mode of operation, the sun gear rotates about the centerline axis in a first direction, the ring gear rotates about the centerline axis in a second direction opposite the first direction, and the carrier does not rotate about the centerline axis.

6. The assembly in accordance with claim 1, further comprising:

a load coupled to the LP compressor drive shaft.

7. The assembly in accordance with claim 1, further comprising:

a load coupled to the LP turbine drive shaft.

8. The assembly in accordance with claim 1, further comprising:

the propulsor rotor brake is configured to place the assembly in the first mode of operation when not engaged and place the assembly in the second mode of operation when engaged.

9. The assembly in accordance with claim 8, wherein when the propulsor rotor brake is engaged, the propulsor rotor brake is configured to stop and prevent rotation of the propulsor rotor drive shaft.

10. An aircraft propulsion system, comprising:

a core engine defining an engine airflow path, the core engine comprising:

a first spool section having a first compressor, a combustion section, a first turbine and a first spool shaft coupled to the first compressor and the first turbine, a second turbine coupled to an input drive shaft, and a second compressor coupled to a first output drive shaft;

an open propulsor rotor disposed near one end of the core engine and coupled to a second output drive shaft, the open propulsor rotor comprising a plurality of rotor blades; and a powertrain assembly coupled to the input drive shaft and the first and second output drives shafts, the powertrain assembly configured to:

transfer power from the input drive shaft to the first output drive shaft and the second output drive shaft during a first mode, and transfer power from the input drive shaft only to the first output drive shaft during a second mode when the second output drive shaft is prevented from rotating.

11. The aircraft propulsion system in accordance with claim 10, wherein the powertrain assembly further comprises:

an epicyclic gearset.

12. The aircraft propulsion system in accordance with claim 11, wherein the epicyclic gearset comprises:

a sun gear rotatable about a centerline axis;

a ring gear circumscribing the sun gear and rotatable about the centerline axis;

a plurality of intermediate gears arranged circumferentially about the centerline axis, each of the plurality of intermediate gears meshed between the sun gear and the ring gear; and a carrier rotatable about the centerline axis, each of the plurality of intermediate gears rotatably mounted to the carrier.

13. The aircraft propulsion system in accordance with claim 12, wherein when in the first mode, the sun gear rotates about the centerline axis in a first direction, the ring gear rotates about the centerline axis in a second direction opposite the first direction, and the carrier rotates about the centerline axis in the first direction.

14. The aircraft propulsion system in accordance with claim 12, wherein when in the second mode, the sun gear rotates about the centerline axis in a first direction, the ring gear rotates about the centerline axis in a second direction opposite the first direction, and the carrier does not rotate about the centerline axis.

15. The aircraft propulsion system in accordance with claim 10, further comprising:

a brake configured to inhibit and stop rotation of the second output drive shaft and prevent the second output drive shaft from rotating.

16. The aircraft propulsion system in accordance with claim 10, further comprising:

a brake configured to cause the aircraft propulsion system to operate in the first mode when disengaged and cause the aircraft propulsion system to operate in the second mode when engaged.

17. The aircraft propulsion system in accordance with claim 10 further comprising:

a load coupled to the first output drive shaft.

18. An open rotor engine having a single open propulsor rotor, the open rotor engine comprising:

a first compressor, a combustion section, a first turbine and a first drive shaft coupled to the first compressor and the first turbine;

a second turbine;

a second compressor; and a powertrain operable to:

transfer power received from the second turbine to the single open propulsor rotor and the second compressor during a first mode of operation, and transfer power received from the second turbine to only the second compressor during a second mode of operation.

19. The open rotor engine in accordance with claim 18, further comprising:

a brake configured to place the open rotor engine in the first mode of operation when not engaged and place the open rotor engine in the second mode of operation when engaged.

20. The open rotor engine in accordance with claim 19, wherein the powertrain comprises:

an epicyclic gearset.

* * * * *